United States Patent [19]

Goode

[11] 4,417,379

[45] Nov. 29, 1983

[54] MACHINE TOOL HEAD HAVING NUTATING SPINDLE

[75] Inventor: Keith F. Goode, Rockford, Ill.

[73] Assignee: The Ingersoll Milling Machine Company, Rockford, Ill.

[21] Appl. No.: 440,832

[22] Filed: Nov. 12, 1982

[51] Int. Cl.³ .......................... B23Q 5/22; B23C 1/12
[52] U.S. Cl. ...................................... 29/35.5; 409/191; 409/200; 409/201; 409/211
[58] Field of Search ............... 409/211, 204, 191, 197, 409/199, 200, 201, 216, 196; 29/35.5, 26 A, 40, 53; 408/237, 236; 51/33 R, 124 L, 124 R

[56] References Cited

U.S. PATENT DOCUMENTS

| 2,310,870 | 2/1943 | Retterath | 408/237 |
| 2,728,268 | 12/1955 | Clifton et al. | 409/197 X |
| 3,232,141 | 2/1966 | Swanson et al. | 408/237 X |
| 3,359,861 | 12/1967 | Johnson et al. | 409/211 |
| 3,690,220 | 9/1972 | Escobedo | 409/211 |
| 3,823,644 | 7/1974 | Mello | 409/204 |
| 4,104,943 | 8/1978 | Calderoni | 409/191 |
| 4,245,939 | 1/1981 | Sear | 409/191 |

FOREIGN PATENT DOCUMENTS

| 2428492 | 2/1980 | France | 409/201 |
| 622590 | 9/1978 | U.S.S.R. | 409/216 |
| 673387 | 7/1979 | U.S.S.R. | 409/201 |

Primary Examiner—William R. Briggs
Attorney, Agent, or Firm—Fitch, Even, Tabin & Flannery

[57] ABSTRACT

A machine tool head having a spindle nutatable about a center at the front of the spindle and at or closely adjacent to the front face of the machine tool head so that the radial reaction to the cutting forces is transmissible from the spindle to the machine-tool head essentially in the plane of the front face of the machine tool head.

2 Claims, 4 Drawing Figures

MACHINE TOOL HEAD HAVING NUTATING SPINDLE

This invention relates to a milling head having a nutating spindle.

As this invention was disclosed, but not claimed, in my copending application Ser. No. 192,687, filed Oct. 1, 1980, now U.S. Pat. No. 4,370,080, this application is a division of that earlier-filed application.

In application Ser. No. 192,687, I claimed the organization of the machine tool head and its relatively movable parts in the context of the drive train by which the spindle drive motor is divorced from the nutating motion of the spindle, but is nevertheless in constant driving engagement with the spindle through a novel and partially planetary bevel-gear drive train.

The aspect of my novel machine tool head which I claim in this application is that physical interrelationship of the rotary slides with the machine tool head which provides rigidity of support for the spindle, and hence for the cutting tool which it holds, with the result that this novel nutating-spindle milling head is capable of cutting complex three-dimensional surfaces at a greater material removal rate with a better finish than prior art devices.

Nutatable spindles, as such, are known to the art. Those which are known, however, are of a nature such that the cutting tool is usually found at the end of an extended, cantilevered articulated structure in which the spindle drive motor partakes of the nutating motion of the spindle. See, for example, U.S. Pat. No. 3,823,644—Mello and U.S. Pat. No. 3,359,861—Johnson.

My earlier application Ser. No. 192,687, as already noted, deals with the organization of the rotary slides with the drive train which effectively permits the separation of the spindle drive-motor from the nutating movement of the spindle. While that separation itself may contribute to the greater stability of the spindle by reducing the mass that needs to be wielded during nutation, it is the particular organization of the two rotary slides relative to each other and within the machine tool head of the first embodiment of my prior application which makes possible the superior rigidity of the nutatable spindle.

In particular, as will be hereinafter explained, the cantilevered support of the cutting tool from the machine tool head of this invention is extremely short, the center of nutation is closely adjacent the front face of the machine tool head, and the two rotary slides are so journalled therein and with each other that the radial reaction forces on the spindle from the cutting action are transferred to the head in major part in the plane of the front face of the machine head.

The accompanying drawings are respectively FIGS. 1 to 4 of my prior application Ser. No. 192,687. In particular:

Figure 1:
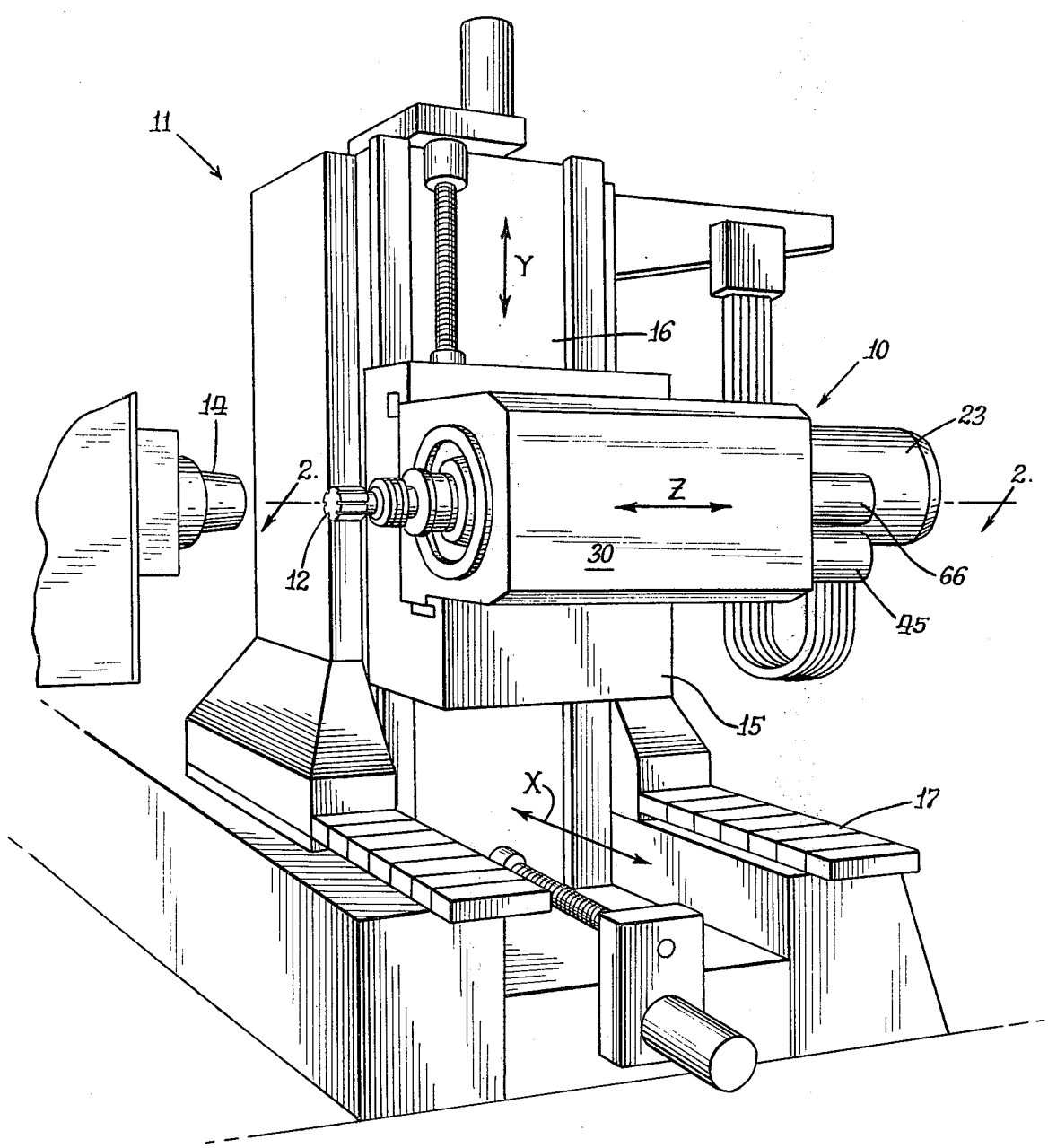
FIG. 1 is a fragmentary perspective view of a typical machine tool equipped with a new and improved head incorporating the unique features of this invention.

The machine tool head 10 of the invention is shown in FIG. 1 as part of a five-axis milling machine 11. The head supports a cutting tool such as a milling cutter 12 which is adapted to remove material from a work piece 14.

The head is supported in ways on a carriage 15 to move horizontally along one axis (commonly called the Z-axis) toward and away from the work piece 14. The carriage 15, in turn, is mounted upon a column 16 to moved upwardly and downwardly along a Y-axis perpendicular to the Z-axis. At its lower end, the column 16 is supported upon a bed 17 for horizontal movement on the bed along an X-axis which is perpendicular to the Y-axis and to the Z-axis.

The head 10, the carriage 15, and the column 16 are each movable along their respective axes by positioning motors controlled by a computerized numerical control (CNC) unit, not shown. The cutting tool 12 can thus be moved linearly in three mutually perpendicular directions, and its movement and position can be precisely controlled.

Figure 2:
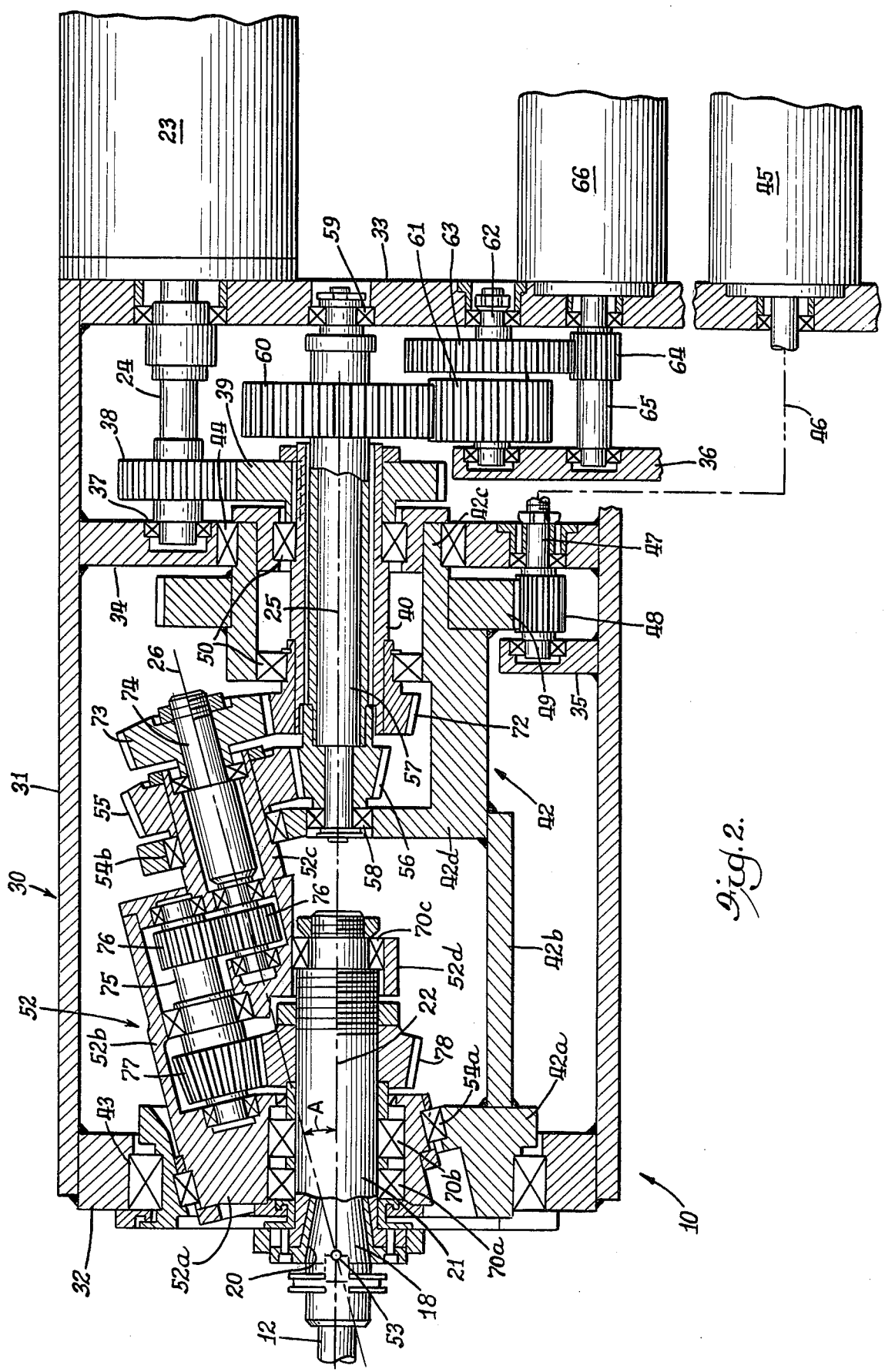
FIG. 2 is an enlarged fragmentary and somewhat schematic cross section taken generally along line 2—2 of FIG. 1.

Referring to FIG. 2, a tapered mounting shank 18 integral with the cutting tool 12 is clamped in a sleeve 20 which, in turn, is rigidly secured in a tubular spindle 21. The spindle is rotated about its own axis 22 by a remote drive motor 23 at the opposite end of the head, through a drive train yet to be described.

In accordance with the present invention, the machine tool head 10 is uniquely constructed to permit the cutting tool 12 and the spindle 21 to nutate about the point of intersection 53 of the mutually inclined axes 25 and 26 of the two rotary slides which permit the nutation, and to nutate relative to the drive motor 23 without interrupting the driving connection between the spindle and its drive motor. The construction of the head, i.e., the relation to the head frame and the drum-within-a-drum relationship of the two relatively rotatable "slides" housed within the head, is such that the center of nutation 53 is closely adjacent to the front face of the head, and the radial reaction to the cutting forces is transmitted from the spindle through the front hubs of the rotary slides and to the frame of the machine tool head itself, essentially within the plane of the front face of the machine tool head.

More specifically, the head 10 includes a main frame in the form of a housing 30 which is mounted on the carriage 15 to move back and forth along the Z-axis, the housing 30 remaining rotationally stationary. The housing is formed as an elongated box comprising an outer sleeve 31 which is closed at its ends by front and rear walls 32 and 33. It will be noted from the drawings that the front wall 32 is formed of plate stock several times thicker than the sleeve 31. An intermediate wall 34 spans the interior of the sleeve 31, stiffening the housing, and mounting webs 35 and 36 extend inwardly from the sleeve 31 at locations appropriate for the mounting of various elements of the several gear trains employed for positioning and driving the spindle. The housing 30 is shown somewhat schematically in FIG. 2, i.e., part of the sleeve 31 has been broken away and the rear wall 33 and the spindle drive motor and spindle positioning motors "rolled out" from their actual cluster arrangement (FIG. 1) into a common plane, to facilitate illustration.

The spindle drive motor 23 is mounted on the rear wall 33 of the housing 30 with a coupled extension 24 of its drive shaft journalled by bearings 37 in the intermediate wall 34 and the end wall 33 (FIG. 2). A gear 38 on the shaft 24 meshes with a gear 39 on a tubular drive shaft 40, whose axis is more or less central of the housing 30. The axis of the drive shaft 40 is the central axis 25 about which the spindle 21 is adapted to nutate.

Mounted within the housing 30 for rotation about the axis 25 is a primary drum-shaped rotary slide 42. It comprises a heavy forward hub 42a which is journalled in a bearing 43 in the heavy front wall 32 of the head, the bearing preferably being a combination radial-thrust roller bearing capable of resisting thrust in either direction along the axis 25. Extending rearwardly from the front hub 42a, the partial wall 42b of the drum-like housing recloses at its rear end in a neck 42c which is journalled by a roller bearing 44 in the intermediate wall 34 of the head frame or housing 30. A ring gear 49 secured to the neck 42c of the drum coaxially therewith and forwardly of the intermediate wall 34 is driven by a pinion 48 on a shaft 47 coupled as an extension of the shaft 46 of the positioning motor 45, and journalled respectively in the web 35 and intermediate wall 34. In the roll-out of FIG. 2, the axis of the shaft 46 of positioning motor 45 is necessarily offset, but it will be understood that the motor 45, under the control of the previously-mentioned CNC unit, controls the rotative position of the rotary slide 42 through the meshing spur gears 48 and 49.

Two axially spaced bearings 50 journal the tubular drive shaft 40 concentrically within the neck 42c of the primary slide 42 for independent rotation relative to the primary slide.

A secondary rotary slide 52 is mounted within the primary slide 42 to rotate relative to the latter about an axis 26 which is inclined relative to the axis 25 of the first slide 42, and intersects that axis at the point 53 (FIG. 2) which defines the center of nutation about which the spindle 21 may swivel. In the illustrated case, the angle A of inclination between the axes 25 and 26 is approximately 15°.

The secondary slide 52 is similarly formed to have a heavy front hub portion 52a from which the slide extends rearwardly as a partial drum-like housing 52b within the drum-like housing 42b of the primary slide 42, and within the housing sleeve 31 of the head. The hub-like front end 52a of the secondary slide is journalled within the front hub 42a of the primary slide 42 by a bearing 54a, which is also preferably a combination radial-thrust bearing capable of resisting axial load in either direction along the axis 26. The similarly neck-like rear end 52c of the housing of the secondary slide 52 is journalled in a tail bearing 54b mounted in an interior wall 42d of the primary slide 42.

The secondary slide 52 is thus mounted to turn on its own axis 26 within the primary slide 42. A bevel gear 55 fastened to the neck-like rear journal 52c of the secondary slide 52 meshes with a bevel gear 56 on a tubular shaft 57. The latter extends through the tubular drive shaft 40 concentrically therewith and is journalled in bearings 58 and 59 supported respectively in the interior wall 42d of the primary slide 42, and in the rear wall 33 of the housing 33. A spur gear 60 on the rear end portion of the shaft 57 meshes with a gear 61 on a counter-shaft 62 which spans the rear wall 33 and the web 36 of the housing 30. A second gear 63 on the counter-shaft 62 meshes with a drive pinion 64 on the shaft extension 65 of the shaft of the positioning motor 66. The latter is supported on the rear end wall of the housing 30 and is controlled by the CNC unit. When the motor 66 is energized, it rotates the secondary slide 52 on its axis 26 within the primary slide 42 through the spur gear train 60–64, the shaft 57, and the meshing bevel gears 55 and 56.

The spindle 21 is journalled for rotation on an axis 22 in three bearings 70a, 70b, and 70c in the secondary slide 52. The bearings 70a and 70b are considerably larger and heavier than the remote tail bearing 70c and are positioned within the front hub portion 52a of the secondary slide and substantially in the plane of the front face 32 of the machine head. The smaller tail bearing 70c at the rear end of the spindle 21 is carried by the interior structure 52d of the secondary slide and serves essentially to support the meshing engagement of the spindle driving gear 78 with its drive train, soon to be described.

Figure 3:
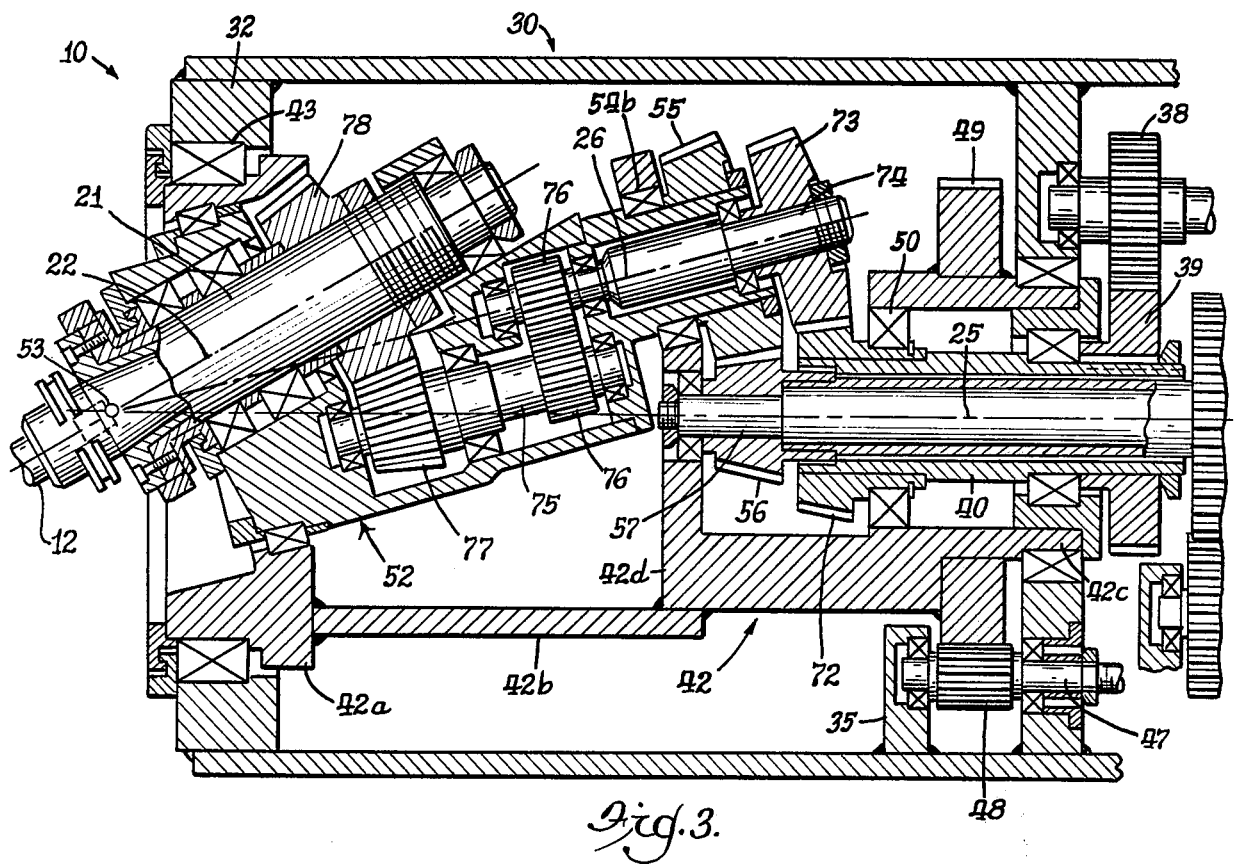
FIGS. 3 and 4 are sectional views similar to FIG. 2, but showing the spindle in different positions.
Figure 4:
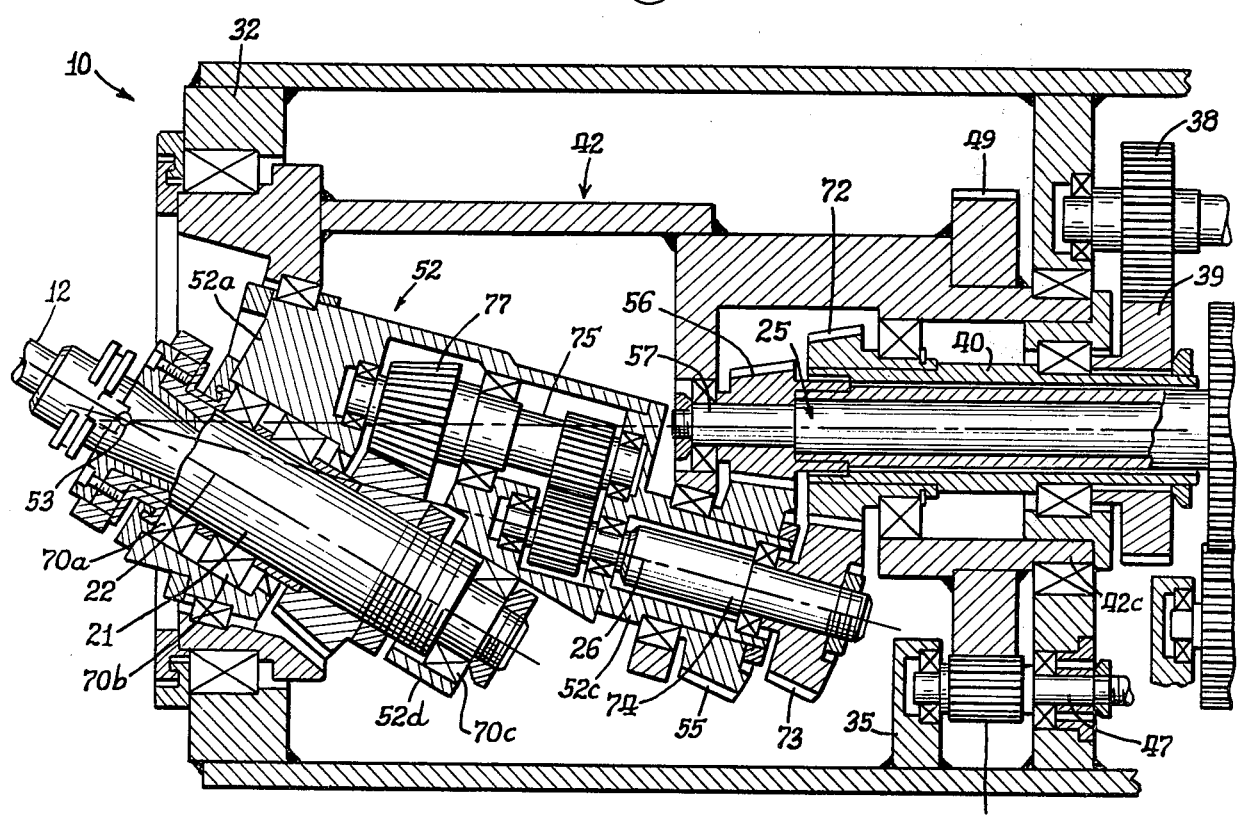

As shown in FIG. 2, the axis 22 of the spindle 21 is inclined to the rotational axis 26 of the secondary slide 52 by an angle which is equal to the angle A. As there shown, the axis 22 also coincides with the axis 25 of the primary slide 42, but that is merely one of the infinite number of positions it may assume within its range of movement. Thus, if the primary slide 42 is held against rotation from the position shown in FIG. 2, and if the secondary slide 52 is rotated by the motor 66, the spindle 21 and its tool 12 are rotated about the axis 26 and tilted and moved in a path which is eccentric with respect to the axis 25 of the primary slide 42. If the secondary slide is rotated 180° from the position shown in FIG. 2, the spindle 21 is turned from the horizontal position of FIG. 2 to the tilted position of FIG. 3 in which the forward end of the spindle is inclined downwardly at an angle double the angle A, i.e., at an angle of 30°. If the primary slide 42 is then rotated 180° about its axis 25 by the positioning motor 45, the spindle is turned to a position in which its forward end portion tilts upwardly at an angle of 30°, as shown in FIG. 4. By rotating both slides 42 and 52 under the control of the CNC unit, the spindle 21 can be made to assume any tilted position between the extremes depicted by FIGS. 3 and 4, and by rotating the slides simultaneously, the end of the tool mounted in the spindle can sweep any path on a sphere subtended by a cone having its apex at the center of nutation 53, and having an apex angle of four times the value of the angle A, i.e., 60° in the illustrated case.

The drive for the nutating spindle 21, effective in all of its many positions within the 60° conical envelope referred to, includes the bevel pinion 72 (FIG. 2) secured to the front end of the drive shaft 40 and meshing with another bevel gear 73 secured to the rear end of the shaft 74 concentrically journalled for rotation within the neck-like rear end 52c of the secondary slide 52. A counter-shaft 75 parallel to the shaft 74 is also journalled within the secondary rotary slide 52, and is connected for rotation with the shaft 74 by a pair of meshing spur gears 76 on the forward end of the shaft 74 and the rear end of the shaft 75 respectively. A bevel pinion gear 77 secured at the forward end of the counter-shaft 75 meshes with a driven bevel gear 78 on the spindle 21 where it emerges from the hub-like front portion 52a of the secondary slide.

Accordingly, when the drive motor 23 is energized, it rotates the drive shaft 40 through the spur gears 38 and 39 which, in turn, rotate the spindle 21 through the bevel gears 72, 73, shaft 74, spur gears 76, shaft 75, and bevel gears 77 and 78. By virtue of the angles of the bevel gears 72, 73, 77, and 78, the driving connection from the drive shaft 40 to the spindle 21 is maintained in all positions of the spindle. During rotation of the primary slide 42, the bevel gears 55–56 and 72–73 remain in meshing engagement, with the gears 55 and 73 merely walking around their meshing partners.

The mounting of the spindle within the front hub portion 52a of the secondary slide, and the drum-within-a-drum relationship of the two rotary slides 52 and 42 within the head of the machine is such as to permit the placement of the center of nutation 53 at the front of the spindle, and at or closely adjacent to the front face of the machine tool head. This shortens the moment arm of the tool and permits the radial reaction of the spindle to the cutting load to be transferred from the spindle bearings 70a and 70b to the hub 52a of the secondary slide and thence to the hub 42a of the primary slide, and thence to the front wall 32 of stationary machine tool head, substantially entirely in the plane of the front face of the head. The tail bearing 70c at the rear of the spindle 21, and the tail bearings 50 and 54b of the two rotary slides, serve essentially to assure the correct meshing relation of the several gear trains, and to resist the relatively small turning moment exerted upon the assembly as a result of the small moment arm afforded the cutting tool by the aforedescribed advantageous relationship.

The superior rigidity of the spindle of this novel machine tool head is demonstrated by its ability to apply power at the rate of one-half horsepower per revolution at spindle speeds as low as 8 R.P.M. while still producing an acceptable chatter-free finish on the work piece.

What is claimed is:

1. A nutatable-spindle machine-tool head comprising
a head frame in the form of a housing having a front face,
an elongated first rotary slide mounted for rotation in said head frame by a front face hub journalled in the front face of the head frame and by an axially remote, stabilizing tail bearing in the head frame,
a second rotary slide mounted for rotation in the first rotary slide by a front face hub journalled in the front face hub of the first slide and by an axially remote, stabilizing tail bearing in the first slide,
a spindle journalled in the face hub of said second slide and by an axially remote stabilizing tail bearing in the second slide,
the axes of rotation of said spindle and of said two slides intersecting in a single point at the front of the spindle and closely adjacent the front face of the head frame with a common acute angle between the spindle axis and that of the second slide and between the axes of two slides, whereby the axis of a tool carried by the spindle can assume any position within a conical envelope having its apex at said point and having an apex angle four times the said common angle,
a planetary gear train for driving the spindle and having a drive gear coaxial with said first rotary slide and a driven gear on the spindle and including at least two meshing pairs of bevel gears, and
separate power means for turning said spindle drive gear and for positioning said rotary slides rotatively about their respective axis,
the major part of the radial cutting load on said spindle being transmitted from slide to slide and to the head frame essentially in the plane of the front face of the head frame.

2. The machine tool head of claim 1 wherein each power means for positioning said rotary slides is an electric motor and a gear train connecting each motor to its associated slide, and the gear train to said second slide is a planetary train with a drive gear on the axis of the first slide and the driven gear on the axis of the second slide, and at least two gears thereof are meshing bevel gears.

* * * * *

UNITED STATES PATENT AND TRADEMARK OFFICE
CERTIFICATE OF CORRECTION

PATENT NO. : 4,417,379
DATED : November 29, 1983
INVENTOR(S) : Keith F. Goode

It is certified that error appears in the above-identified patent and that said Letters Patent is hereby corrected as shown below:

Column 3, line 59, change "33" to --30--.

Signed and Sealed this

Sixteenth Day of October 1984

[SEAL]

Attest:

GERALD J. MOSSINGHOFF

Attesting Officer     Commissioner of Patents and Trademarks